United States Patent [19]
Evans

[11] Patent Number: 5,188,063
[45] Date of Patent: Feb. 23, 1993

[54] COMBINATION SIMULATED PLANTER AND CAT LITTER ENCLOSURE

[76] Inventor: Ronald G. Evans, 18139 Erik Ct., #252, Canyon Country, Calif. 91351

[21] Appl. No.: 901,202

[22] Filed: Jun. 19, 1992

[51] Int. Cl.[5] ............................................. A01K 29/00
[52] U.S. Cl. .................................... 119/165; 119/28.5
[58] Field of Search ............... 119/165, 166, 167, 168, 119/169, 170, 19, 28.5; D30/108, 161, 109, 112, 117, 118; D6/440, 447, 448, 450, 475, 451; D11/117, 152; D34/4

[56] References Cited

U.S. PATENT DOCUMENTS

| | | | |
|---|---|---|---|
| D. 224,685 | 8/1972 | Michlap | 119/28.5 X |
| D. 250,051 | 10/1978 | Spinks | 119/165 X |
| 1,773,141 | 8/1930 | Hodgson | 119/165 X |
| 4,177,761 | 12/1979 | Bellocchi, Jr. | D30/108 X |

*Primary Examiner*—Gene Mancene
*Assistant Examiner*—Thomas Price
*Attorney, Agent, or Firm*—Gerald L. Price

[57] ABSTRACT

A combination simulated planter and cat litter enclosure comprising a simulated planter having a false bottom portion with an opening leading therein for receiving cat litter in the bottom portion. A simulated plant closes off the top of the simulated planter having a simulated plant trunk and simulated plant foilage.

10 Claims, 1 Drawing Sheet

COMBINATION SIMULATED PLANTER AND CAT LITTER ENCLOSURE

BACKGROUND OF THE INVENTION

1. Field of the Invention

The invention relates to cat litter enclosures; and, more particularly, to a combination simulated planter and cat litter enclosure.

2. Description of the Prior Art

Cats are among the most popular of house pets. More people keep cats for pets than any other animal, including dogs. However, as population shifts from single house ownership to apartment dwelling, it is difficult to keep a cat or dog confined to such apartments. Thus, cat litter boxes are used to contain the cat's waste products particularly when there is no way for the cat to leave the house or apartment. In the past, such cat litter boxes were usuallly kept in a spare bedroom or storage area or the like since odors from such boxes are generally unpleasant and the boxes and litter unsightly.

In U.S. Pat. No. Des. 298,371, a barrel-shaped pet station is disclosed having a ventilated top. Although less unsightly than known cat litter boxes, a barrel is an unusual object to have in one's house or apartment. U.S. Des. Pat. Nos. 228,558; 276,752; 230,285 and U.S. Pat. No. 4,792,082 show simulated houses for a cat box which, although not as unusual an object as a barrel, are still rather strange an object for a house or apartment. A simulated house for a cat are also shown in U.S. Pat. Nos. 3,752,120 and 5,014,649, Pat. No. 3,752,120 having three nesting compartments. The latter is a rather complicated arrangement.

A modern looking pet house is shown in U.S. Pat. No. 3,618,568. It is not only complicated with nested sections but still is a house and indicates the presence of a cat or dog.

In U.S. Pat. No. 4,683,839, a table used for a cat box is disclosed with the idea of disguising it as a lamp stand. One may not need a lamp stand nor desire the same. Also, an electric outlet must be nearby to be effective as a lamp stand.

U.S. Pat. No. 3,822,671 is directed to an outside animal toilet U.S. Des. Pat. No. 232,565 may also be the same as it has an attached scoop paddle. Finally, U.S. Des. Pat. No. 250,051 shows a cat box in the form of a truncated cylinder having an opening leading into the bottom thereof. Such a device would be highly unusual in a home or apartment.

Odorless cat litter has evolved over the years so that, today, a cat litter box need not be hidden away in a bathroom or storage area.However, if brought out into a living room area, the above noted prior art devices would stand out as unusual objects and indicate the presence of a cat. Human nature being what it is, one might then "smell" the litter of the cat box.

There is a need for a cat litter box in the form of a known household object that would conventionally be found in one's living quarters. Such a box should be easy to clean and take up little space.

SUMMARY OF THE INVENTION

It is an object of this invention to provide a combination simulated planter and cat litter enclosure.

It is a further object of this invention to provide such a device which can be located in an apartment or a house and blend in with the surroundings.

It is still another object of this invention to provide the combination of the foregoing objects which can be quickly and easily cleaned.

These and other objects are preferably accomplished by providing a simulated planter having a false bottom portion with an opening leading therein for receiving cat litter in the bottom portion. A simulated plant closes off the top of the simulated planter having a simulated plant trunk and simulated plant foilage.

DESCRIPTION OF THE PREFERRED EMBODIMENT

Figure 1:
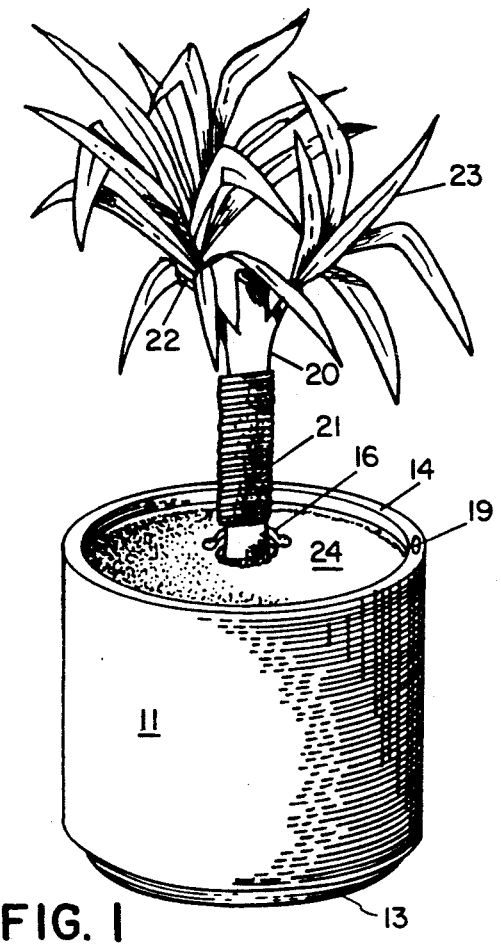
FIG. 1 is a front perspective view of a combination simulated planter and cat litter enclosure in accordance with the teachings of my invention.
Figure 2:
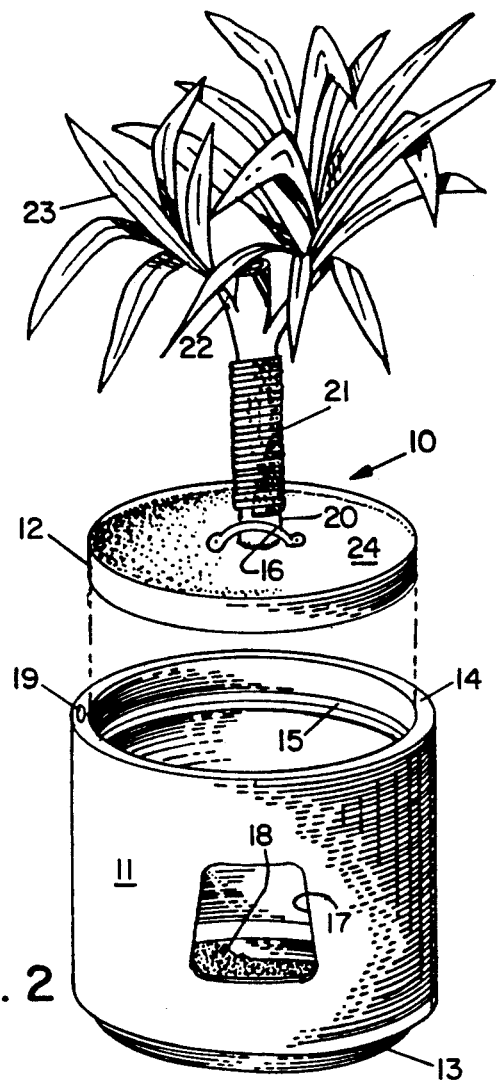
FIG. 2 is a rear perspective exploded view of the device of FIG. 1.
Figure 3:
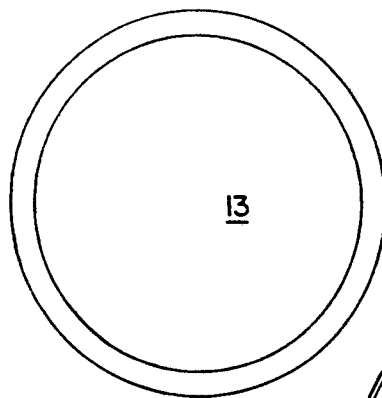
FIG. 3 is a bottom plan view of the device of FIGS. 1 and 2.

Referring now to FIG. 1 of the drawing, a combination simulated planter and cat litter enclosure device 10 is shown having a hollow container portion 11 simulating a planter, and a removable top lid 12 (see FIG. 2). Container portion 11 may be a truncated cylinder having a reduced diameter portion 13 closing off the bottom (see also FIG. 3) to simulate the shape of a conventional planter.

Figure 4:
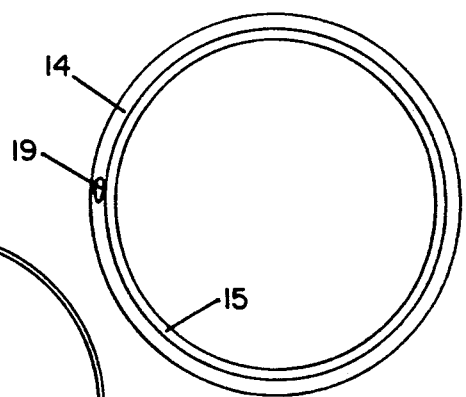
FIG. 4 is a top plan view of the container portion alone of the device of FIGS. 1 to 3.

Container portion 11 also has an annular rim or edge 14 (FIG. 2) at top and an inwardly extending annular ridge 15 below rim or edge 14 extending inwardly toward the center of container portion 11 (see FIG. 4). Ridge 15 thus acts to support lid 12 on top of the same as seen in FIG. 1 and can be understood by comparing the same with the exploded view in FIG. 2. Of course, ridge 15 need not extend all the way around the inner wall of container portion 11 (or a plurality of spaced ridge sections may be used.).

Figure 5:
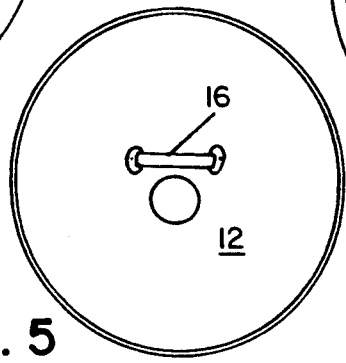
FIG. 5 is a top plan view of the lid alone of the device of FIGS. 1 to 4, the simulated turf and trunk being omitted for convenience of illustration.

As seen in FIGS. 2 and 5, a handle 16 is optionally provided on lid 12 for lifting the same off of container portion 11 for emptying the latter. Handle 16 may be of any suitable configuration and is shown as U-shaped and secured to lid 12 in any suitable manner, such as by rivets or the like.

An opening 17, of a size suitable to allow a cat to pass therethrough, is provided in the side wall of container portion 11. As seen in FIG. 2, conventional kitty litter 18 may be deposited on the bottom of container portion 11. This litter can be removed from container portion 11 by merely lifting off lid 12 via handle 16 and emptied. Of course, a removable tray may also be provided inside of container portion 11, the litter being disposed on the top of the tray.

One or more holes 19 (FIGS. 1 and 4) are provided in the rim or edge 14 for draining the interior of container portion 11.

A simulated plant trunk 20 is mounted at preferably the middle of lid 12 extending vertically upwardly therefrom. If desired, a cat scratching post portion 21 may be provided on trunk 20 as is well known for use with cats.. As seen in FIGS. 1 and 2, trunk 20 simulates a tree or plant trunk with branch portion 22 at top terminating in foilage 23 in the form of leaves or the like. Of course, such foilage could be flowers, blossoms, buds, ferns, etc. Preferably, a trunk 20, branches 22 and foilage 23 simulating a conventional house plant is used. Also, lid 12 may be removed by grasping trunk 20 and lifting the same, if desired, eliminating the need for handle 16. Finally, simulated turf or grass 24 may be provided on the surface of lid 12 to carry out the simulation of a planter.

Any suitable materials, such as plastic, metal, etc. may be used. The trunk 20 and branches 22 may be made from an actual tree limb, if desired, with foilage 23 being of silk or other material simulating actual leaves or the like. Any suitable colors, preferably coventional turf, grass, foilage or trunk colors may be used. Any suitable roughened or coarse material, such as carpeting, may be used for scratching trunk portion 21, preferably of a color blending in with the color of trunk 20, may be used.

It can be seen that I have disclosed a combination simulated planter and cat litter enclosure that can be placed in any suitable location in a home or apartment or the like. Odorless kitty litter may be used and opening 17 can be turned away from direct view so that one sees only a simulated planter. The device can be quickly and easily cleaned.

Variations of the foregoing invention may occur to those skilled in the art and the scope of the invention should be limited only by the scope of the appended claims.

I claim:

1. A combination simulated planter and cat litter enclosure comprising:
    a hollow container portion having a side wall, a bottom wall and an open top;
    an opening through said side wall leading into the interior of said container portion; and
    a removable lid closing off the top of said container portion, said lid having a simulated tree trunk extending generally vertically upwardly therefrom in a direction away from said container portion, and simulated foilage associated with the terminal ends of said trunk.

2. In the combination of claim 1 wherein said container portion is in the configuration of a truncated cylinder simulating a planter.

3. In the combination of claim 2 wherein said container portion terminates at the bottom in a wall portion of a reduced outer diameter.

4. In the combination of claim 1 wherein said container portion terminates at its upper end in a rim having a small opening therethrough.

5. In the combination of claim 1 wherein said container portion has a ledge on the inner wall thereof disposed below the open end of said container portion.

6. In the combination of claim 5 wherein said lid is supported on said ledge when closing off the open end of said container portion.

7. In the combination of claim 1 including a handle mounted on said lid on the side of said lid opposite said container portion for lifting said lid off of said container portion.

8. In the combination of claim 1 including a scratching trunk portion of a coarse or roughened material associated with at least a portion of said trunk for providing a scratching posting for a cat.

9. In the combination of claim 1 wherein the side of said lid opposite said container portion is covered with material simulating turf or grass.

10. In the container of claim 1 wherein the upper end of said trunk terminates in one or more simulated branches, said foilage being connected to said branches.

* * * * *